United States Patent [19]

Imai

[11] Patent Number: 4,782,405
[45] Date of Patent: Nov. 1, 1988

[54] TRACKING CONTROL ADJUSTMENT FOR A TAPE USING MANUAL SWITCHES

[75] Inventor: Toshiaki Imai, Chiba, Japan

[73] Assignee: Sony Corporation, Japan

[21] Appl. No.: 23,788

[22] Filed: Mar. 9, 1987

[30] Foreign Application Priority Data

Mar. 20, 1986 [JP] Japan ................... 61-64562

[51] Int. Cl.⁴ .................. G11B 5/58; G11B 5/584
[52] U.S. Cl. ........................ 360/77; 360/70; 360/73
[58] Field of Search .............. 360/10.1–10.3, 360/70, 73, 75, 77, 8, 14.2, 13; 318/314, 318

[56] References Cited

U.S. PATENT DOCUMENTS

| | | | |
|---|---|---|---|
| 3,711,640 | 1/1973 | Takano et al. ............ | 360/77 |
| 3,958,271 | 5/1976 | Sumiyoshi ................ | 360/70 |
| 4,336,559 | 6/1982 | Koyama et al. .......... | 360/73 |

Primary Examiner—Raymond F. Cardillo
Assistant Examiner—Steven R. Garland
Attorney, Agent, or Firm—Vorys, Sater, Seymour & Pease

[57] ABSTRACT

A tracking control system is capable of simplification of tracking operations for a recording and/or reproduction apparatus, such as VTR. The tracking control system employs an up-switch and a down-switch for increasing and decreasing tracking control or adjustment magnitude. This simplifies tracking operations to be performed by the user. The tracking control system additionally facilites with the feature of instantly setting the tracking control system at a predetermined position. Instant setting operation is performed by operating the up-switch and down-switch simultaneously.

10 Claims, 3 Drawing Sheets

TRACKING CONTROL ADJUSTMENT FOR A TAPE USING MANUAL SWITCHES

BACKGROUND OF THE INVENTION

1. Field of the Invention

The present invention relates generally to a tracking control system for a recording and/or reproducing apparatus, such as a video tape recording and/or reproducing apparatus (VTR).

2. Description of Background Art

In peripheral scanning type recording and/or reproducing apparatus, such as VTRs, tracking has to be performed for adjusting relative position of a magnetic head mounted on a rotary head drum to be at a predetermined position relative to a recording track on a recording medium, such as VTR tape. Conventional VTRs facilitating slow reproduction mode, usually perform normal tracking control and slow tracking control for tracking the magnetic heads relative to the recording tracks. For instance, when VTR is operated in fast reproduction mode and normal reproduction mode, the normal tracking control is selected for controlling phase of a capstan motor. On the other hand, when the VTR operates in slow reproduction mode, the slow tracking control is selected for controlling a braking device for a capstan motor.

Adjusting magnitude for tracking the magnetic head relative to the recording track tends to fluctuate between individual VTRs due to mechanical errors in tape driving system and differences in the braking period of capstan motor. This requires adjustment of magnitude of tracking control with respect to each VTR. In addition, since each individual VTR has its own unique tracking adjustment magnitude, additional adjustment is required to compensate differences of tracking adjustment magnitude in reproducing video signals that have been recorded by means of different VTR.

In order to allow the aforementioned control, tracking volumes which are operable through rotary dials, are provided in each normal tracking control circuit and slow tracking control circuit. Therefore, the user selects one of the tracking volumes corresponding to the selected reproduction mode, to perform tracking with respect to VTR tape recorded by means of different VTR to minimize noise in the video signal to obtain the optimum tracking condition.

On the other hand, when the VTR tape has been recorded by means of the same VTR, the tracking volume corresponding to the selected reproduction mode should be returned to an initial or normal position or a center click position to obtain a suitable tracking position.

However, such conventional tracking control operation is troublesome work for the users. For instance, the conventional tracking control system requires selection of one of two tracking volumes for performing tracking control operation. When the selected one of the tracking volumes does not correspond to the selected reproduction mode, suitable tracking cannot be made.

SUMMARY OF THE INVENTION

Therefore, it is an object of the invention to provide a tracking control system which simplifys tracking operation.

In order to accomplish the aforementioned and other objects, a tracking control system, according to the present invention, employs an up-switch and a down-switch for increasing and decreasing tracking control or adjustment magnitude respectively. This simplifies the tracking operation to be performed by the user. The tracking control system also has the additional feature of instantly setting the tracking control system at a predetermined position. Instant setting operations are performed by operating the up-switch and down-switch simultaneously.

According to one aspect of the invention, a tracking control system comprises a head assembly for reproducing data recorded on a recording track of a recording medium, first means for driving the recording medium with the recorded track across the head assembly, second means for adjusting relative position of the head assembly and the recorded track on the recording medium at the position where the recorded data is reproduced through the head assembly, the relative position including a preset standard position, third means, cooperative with the second means, for controlling the second means, the third means including a first switch manually operable for operating the second means to cause cyclical shifting the relative poisition between the head assembly and the recording track in a first direction and a second switch manually operable for operating the second means to cause cyclical shifting the relative position in a second direction opposite to the first direction, and fourth means, responsive to simultaneous manual operation of the first and second switches, for operating the second means to set the relative position at the standard position.

The tracking control system may further comprise memory means for storing a first data indicative of the standard position and second data indicative of a current relative position. In the preferred embodiment, the third means derives a third data indicative of relative position toward which the second means is operated based on the second data and predetermined shifting magnitude in the first and second directions. In the practical operation, the third means increases the third data by a value corresponding to the predetermined shifting magnitude when manual operation of the first switch is detected, to cause shifting of the relative position in the first direction and decreases the third data by the desired value when manual operation of the second switch is detected, to cause shifting of the relative position in the second direction. In order to cause shifting the relative position cyclically, the third means cyclically checks manual operation of the first and second switches for cyclically adjusting the relative position by operating the second means. This allows cyclical shifting of the relative position by maintaining one of the first and the second switches in manually operated position.

In the further preferred embodiment, the first means is operable for driving the recording medium at mutually different first and second speeds for reproducing the recorded data at different reproduction speed modes, and the second means comprises a first adjusting means active while the first means is in operation at the first speed, for adjusting its relative position, and a second adjusting means active while the first means is in operation at the second speed, for adjusting relative position. In this case, a memory means stores a first speed reproduction mode for driving the recording medium at a first speed, a second data indicative of a second standard position for a second speed reproduction mode to drive the recording medium at a second speed, a third data indicative of current relative position between the head assembly and the recording track in the first speed reproduction mode, and fourth data indicative of current relative position in the second speed reproduction mode. Accordingly, the third means derives a fifth data indicative of relative position toward which the second means is operated based on the third data and predetermined first shifting magnitude in the first and second directions during the first speed reproduction mode operation, and derives a sixth data indicative of relative position toward which the second means is operated based on the fourth data and second predetermined shifting magnitude in the first and second directions during the second speed reproduction mode operation. In practice, the third means increases the fifth data by a first value corresponding to the first shifting magnitude when manual operation of the first switch is detected, to cause shifting of the relative position in the first direction, decreases the fifth data by the first value when manual operation of the second switch is detected, to cause shifting of the relative position in the second direction, increases the sixth data by a second value corresponding to the second shifting magnitude when manual operation of the first switch is detected, to cause shifting of the relative position in the first direction, and decreases the sixth data by the second value when manual operation of the second switch is detected, to cause shifting of the relative position in the second direction.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
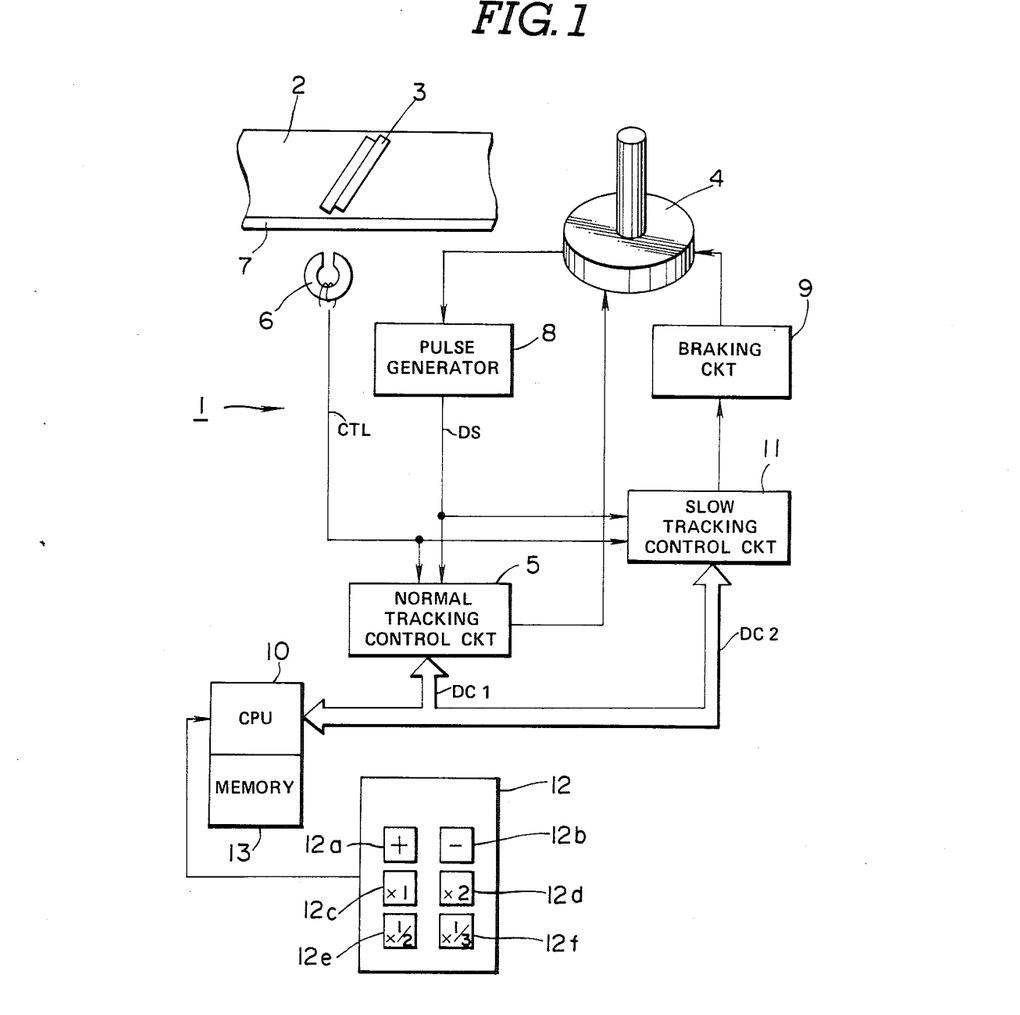
FIG. 1 is a block diagram of the preferred embodiment of a tracking control system for a peripheral scanning type magnetic tape recording and/or reproducing apparatus, according to the invention.

Referring now to the drawings, particularly to FIG. 1, the preferred embodiment of a tracking control system 1 is designed for controlling driving and braking of a capstan motor 4 so that a magnetic head of a VTR can be suitably and accurately guided with respect to a recording track 3 on a VTR tape 2.

The tracking control system 1 includes a normal tracking control circuit 5. The normal tracking control cirucit 5 receives a control signal CTL (hereafter reffered to CTL signal) recorded on a control signal track on the tape 2 reproduced by a control head 6. The normal tracking control circuit 5 also receives a motor speed indicative signal DS produced by a pulse generator 8 representative of the revolution speed of the capstan motor. The normal tracking control circuit 5 is further connected to CPU 10 to receive therefrom a normal tracking control signal $DC_1$. The normal tracking control circuit 5 derives a control value based on the CTL signal, the motor speed indicative signal DS and the normal tracking control signal $DC_1$ for controlling phase of the capstan motor 4 in order to perform normal tracking control.

The tracking control circuit 1 also has a slow tracking control circuit 11 which is also connected to the control head 6 and the pulse generator 8 to receive therefrom the CTL signal and the motor speed indicative signal DS. The slow tracking control circuit 11 also receives a slow tracking control signal $DC_2$. Based on the CTL signal, the motor speed indicative signal DS and the slow tracking control signal $DC_2$, the slow tracking control circuit 11 derives a control value for controlling a brake circuit 9 which applies the brake for the capstan motor 4, in order to perform slow tracking control.

CPU 10 is operably associated with a manual controller 12. The manual controller 12 has a plurality of operation switches 12a through 12f, such as contact switches. CPU is further cooperably associated with a memory 13 for storing preset tracking data. In the shown embodiment, the manual controller 12 includes up-switch 12a, down switch 12b, a normal reproduction mode switch 12c, fast speed (double speed) reproduction mode switch 12d, slow speed (half speed and one-third speed) reproduction mode switches 12e and 12f. CPU 10 is responsive to manual operation of one of the up switch 12a and the down switch 12b to read out stored tracking data corresponding to the reproduction mode selected by the switches 12c through 12f. Based on the read tracking data, CPU 10 outputs one of the normal and slow tracking control signals $DC_1$ and $DC_2$.

CPU 10 periodically or cyclically executes the tracking control program of FIG. 2 for performing tacking control operation. In execution of the tracking control program, CPU 10 checks whether at least one of the up and down switches 12a and 12bv are operated or not. Namely, while CPU 10 is active, the tracking control system 1 is constantly held in stand-by state to be ready to perform tracking operation in response to manual operation of one of the up and down switches 12a and 12b.

Figure 2A:
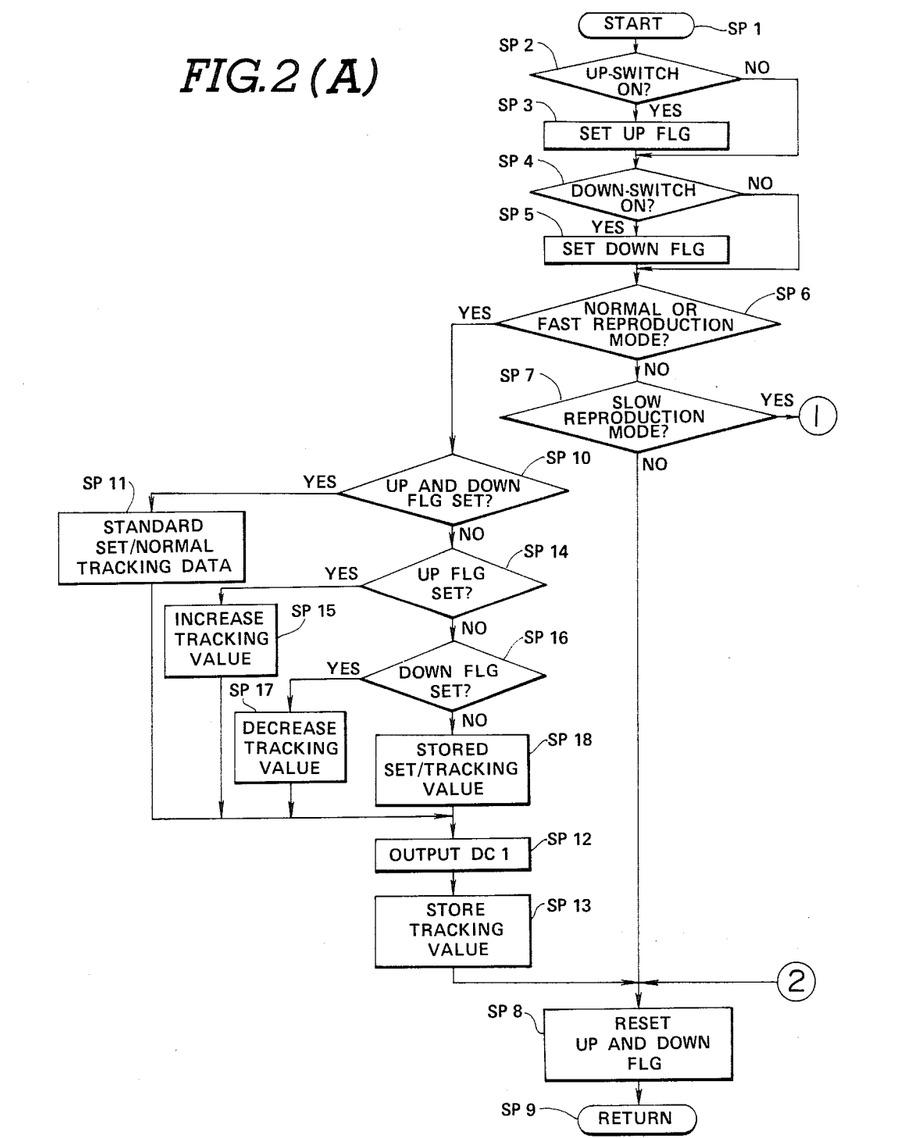
FIGS. 2(A) and 2(B) illustrates a sequence of flowchart of a tracking control program to be performed by the tracking control system of FIG. 1.
Figure 2B:
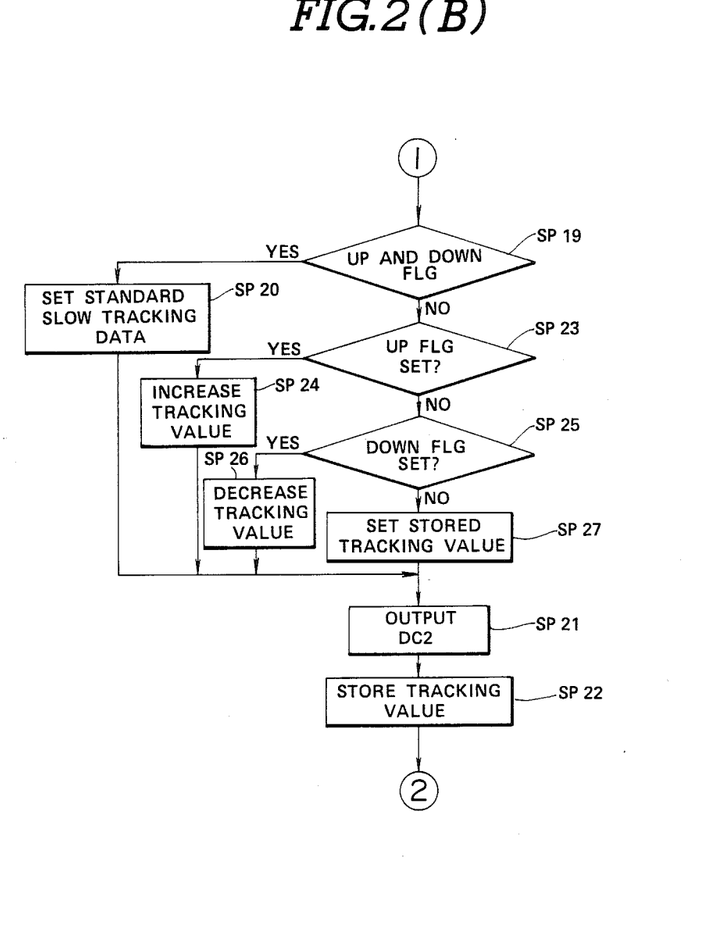

During practical operation, the tracking control program of FIGS. 2(A) and 2(B) are started at a step $SP_1$. Immediately after starting execution of the tracking control program, check is performed whether the up switch 12a is operated or not, at a step $SP_2$. When operation of the up switch 12a is detected at a step $SP_2$, an UP flag is set at a step $SP_3$. After setting the UP flag at a step $SP_3$ or when operation of the up switch 12a is not detected as checked at the step $SP_2$, process goes to a step $SP_4$ to check whether the down switch 12b is operated or not. When operation of the down switch 12b is detected at the step $SP_4$, a DOWN flag is set at a step $SP_5$.

After the step $SP_5$ or when the down switch is not operated as checked at the step $SP_4$, process goes to a step $SP_6$. In the step $SP_6$, reproduction mode is checked whether normal speed reproduction mode or fast speed reproduction mode is selected through the switches 12c or 12d. When the reproduction mode is not normal speed reproduction mode and fast speed reproduction mode, process goes to a step $SP_7$ to check whether the reproduction mode is slow speed reproduction mode selected through the switches 12e and 12f. When the reproduction mode as checked at the step $SP_7$ is not slow speed reproduction mode, and consequently, the non of the reproduction mode is selected, the UP and DOWN flags are reset at a ste $SP_8$ and process returns to the first step $SP_1$ through a step $SP_9$.

On the other hand, when the reproduction mode as checked at the step $SP_6$ is normal or fast speed reproduction mode, process goes to a step $SP_{10}$. At the step $SP_{10}$, the UP and DOWN flags are checked whether both of flags are set. If both of flags are set as checked at the step $SP_{10}$, standard normal tracking data stored in the memory 13, is read out and set as tracking control data, at a step $SP_{11}$. Based on the set tracking control data set at the step $SP_{11}$, the tracking control signal $DC_1$ is derived and output at a step $SP_{12}$. In response to the tracking control signal $DC_1$ from CPU 10, the normal tracking control circuit 5 operates the capstan motor 4 to set the phase corresponding to the standard normal tracking data read out at the step $SP_{11}$.

After outputting the tracking control signal $DC_1$ at the step $SP_{12}$, the value of the tracking control signal $DC_1$ which represents the standard normal tracking data, is stored in a normal tracking memory area in the memory 13, at a step $SP_{13}$. Thereafterm process goes to the step $SP_8$ to reset the UP and DOWN flags and return to the step $SP_1$ through the step $SP_9$.

Therefore, when both of the up switch 12a and down switch 12b are both operated simultaneosly to set both of UP and DOWN flags at the steps $SP_3$ and $SP_5$, VTR is operated in selected normal speed or fast speed reproduction mode in standard tracking condition On the other hand, when either the UP flag or DOWN flag is not set as checked at a step $SP_{10}$, check is performed whether the UP flag is set, at step $SP_{14}$. When setting of the UP flag is detected at the step $SP_{14}$, the value stored in the normal tracking memory area in the memory 13 is read out and increased at a predetermined normal increasing value which is stored in the memory 13, at a step $SP_{15}$. CPU 10 derives the tracking control signal $DC_1$ based on the increased value as derived at the step $SP_{15}$ and output the same to the normal tracking control circuit 5, at a step $SP_{12}$. The content of the normal tracking memory area is then updated with the output tracking control signal value, at a step $SP_{13}$.

Therefore, by operating the up switch 12a during normal speed or fast speed reproduction mode, the tracking magnitude which is advancing magnitude of the capstan motor's phase from a standard phase corresponding to a standard normal tracking position, is increased at a given magnitude corresponding to the unit value to be added. As will be appreciated herefrom, the tracking magnitude is increased at the given magnitude every time the up switch 12a is operated.

On the other hand, when the UP flag is not set as checked at the step $SP_{14}$, the DOWN flag is checked whether it is set or not, at a step $SP_{16}$. When setting of the DOWN flag is detected at the step $SP_{16}$, the value stored in the normal tracking memory area of the memory 13 is decreased by a predetermined normal decreasing value which is stored in the memory 13 to be read out in response to operation of the down switch during nommal or fast speed reproduction, at a step $SP_{17}$. Based on the decreased value as derived at the step $SP_{17}$, the tracking control signal $DC_1$ is derived and output at the step $SP_{12}$. Then the tracking control signal value is stored in the normal tracking memory area at the step $SP_{13}$.

Therefore, by operating the down switch 12b during normal speed reproduction mode, the tracking magnitude which is retarding magnitude of application timing of the brake for the capstan motor a standard phase corresponding to a strandard normal tracking position, is decleased at a given magnitude corresponding to the unit value to be subtracted to advance the application timing of the brake for the capstan motor. As will be appreciated herefrom, the tracking magnitude is descreased at the given magnitude every time manual operation of the down switch 12b is detected.

When the DOWN flag is not set as checked at the step $SP_{16}$, which indicates neither of the up and down switches 12a and 12b are operated, the stored value in the normal tracking memory area in the memory 13 is read out. In this case, the tracking control signal $DC_1$ derived from read out value is output at the step $SP_{12}$. At this time, the tracking magnitude to be changed is zero, and the phase of the capstan motor 4 is held at its unshifted position.

On the other hand, when slow reproduction mode is selected through one of the switches 12e and 12f, process goes to a step $SP_{19}$. At the step $SP_{19}$, the UP and DOWN flags are checked whether both of flags are set, as in the step $SP_{10}$. If both of flags are set as checked at the step $SP_{19}$, standard slow tracking data stored in the memory 13, is read out and set as tracking control data, at a step $SP_{20}$. Based on the set tracking control data set at the step $SP_{20}$, the tracking control signal $DC_2$ is derived and output at a step $SP_{21}$. In response to the tracking control signal $DC_2$ from CPU 10, the slow tracking control circuit 5 operates the capstan motor 4 to set the phase corresponding to the standard slow tracking data read out at the step $SP_{20}$.

After outputting the tracking control signal $DC_2$ at the step $SP_{21}$, the value of the tracking control signal $DC_2$ which represents the standard slow tracking data, is stored in a slow tracking memory area in the memory 13, at step $SP_{22}$. Thereafter process goes to the step $SP_8$ to reset the UP and DOWN flags and return to the step $SP_1$ through the step $SP_9$.

Therefore, when both of the up switch 12a and down switch 12b are both operated simultaneosly to set both of UP and DOWN flags at the steps $SP_3$ and $SP_5$, VTR is operated in selected slow speed reproduction mode in standard tracking condition.

On the other hand, when either the UP flag or DOWN flag is not set as checked at a step $SP_{19}$, check is performed whether the UP flag is set, at step $SP_{23}$. When setting of the UP flag is detected at the step $SP_{23}$, the value stored in the slow tracking memory area in the memory 13 is read out and increased at a predetermined slow increasing value which is stored in the memory 13, at a step $SP_{24}$. CPU 10 derives the tracking control signal $DC_2$ based on the increased value as derived at the step $SP_{24}$ and output the same to the slow tracking control circuit 5, at a step $SP_{21}$. The content of the normal tracking memory area is then updated with the output tracking control signal value, at a step $SP_{22}$.

Therefore, by operating the up switch 12a during slow speed reproduction mode, the tracking magnitude which is retarding magnitude of application timing of the brake for the capstan motor the standard phase corresponding to a standard slow tracking position, is increased at a given magnitude corresponding to the unit value to be added. As will be appreciated herefrom, the tracking magnitude is increased at the given magnitude every time manual operation of the up switch 12a is detected.

On the other hand, when the UP flag is not set as checked at the step $SP_{23}$, the DOWN flag is checked whether it is set or not, at a step $SP_{25}$. When setting of the DOWN flag is detected at the step SP25, the value stored in the normal tracking memory area of the memory 13 is decreased by a predetermined slowly decreasing value which is stored in the memory 13 and to be read out in response to operation of the down switch during normal or fast speed reproduction, at a step $SP_{26}$. Based on the decreased value as derived at the step $SP_{26}$, the tracking control signal $DC_2$ is derived and output at the step $SP_{21}$. Then the tracking control signal value is stroed in the slow tracking memory area at the step $SP_{22}$.

Therefore, by operating the down switch 12b during slow speed reproduction mode, the tracking magnitude which is retarding magnitude of application timing brake for the capstan motor a standard phase corresponding to a standard slow tracking position, is decleased at a given magnitude corresponding to the unit value to be subtracted to advance the application timing of the brake for the capstan motor. As will be appreciated herefrom, the tracking magnitude is decreased at the given magnitude every time manual operation of the down switch 12b is detected.

When the DOWN flag is not set as checked at the step $SP_{25}$, which indicates non of the up and down switches 12a and 12b are operated, the stored value in the slow tracking memory area in the memory 13 is read out at a step $SP_{27}$. In this case, the tracking control signal $DC_2$ derived based on the read out value is output at the step $SP_{21}$. At this time, the tracking magnitude to be changed is zero, the braking timing for the capstan motor 4 is held at unshifted position.

In practical tracking control operation, the user manually operates up and down switches 12a and 12b observing a monitor screen in order to look for the best tracking position at which the least noise is superimposed on the reproduced image. During tracking control operation in normal or fast speed reproduction mode, the capstan motor phase is cyclically advanced at the given magnitude corresponding to the normal increasing value, as long as the up switch 12a is contineously operated. Namely, while the up switch 12a is sequentially operated or held depressed, CPU 10 performs operations in the steps $SP_1$, $SP_2$, $SP_3$, $SP_4$, $SP_6$, $SP_{10}$, $SP_{14}$, $SP_{15}$, $SP_{12}$, $SP_{13}$, $SP_8$, $SP_9$ cyclically at the timing of execution of the tracking control program. When the best tracking position with the least noise on the reproduced image can be found, the user releases the up switch 12a from operation. As a result, the answer at the block $SP_2$ becomes NO in the subsequent cycle of the program execution. Therefore, the phase of the capstan motor 4 is never advanced any further.

On the other hand, the capstan motor phase is cyclically retarded at the given magnitude corresponding to the normal decreasing value, as long as the down switch 12b is sequentially operated. Namely, in this case, CPU 10 performs operations in the steps $SP_1$, $SP_2$, $SP_4$, $SP_5$, $SP_6$, $SP_{10}$, $SP_{14}$, $SP_{16}$, $SP_{17}$, $SP_{12}$, $SP_{13}$, $SP_8$, $SP_9$. After releasing the down switch 12b, the DOWN flag which is set in the step $SP_5$ while the down switch 12b is operated, will thus never set. Therefore, the capstan motor phase will never retarded any further.

When both of the up and down switches 12a and 12b are operated simultaneously, CPU 10 performs operations in the steps $SP_1$, $SP_2$, $SP_3$, $SP_4$, $SP_5$, $SP_6$, $SP_{10}$, $SP_{11}$, $SP_{12}$, $SP_{13}$, $SP_8$, $SP_9$. Through the sequence of operation, the capstan motor phase is set at the predetermined standard phase corresponding to the normal standard tracking position. On the other hand, while non of the up and down switches 12a and 12b are depressed, the tracking position corresponding to the value stored in the normal tracking memory area is cyclically read out through the operations in the steps $SP_1$, $SP_2$, $SP_4$, $SP_6$, $SP_{10}$, $SP_{14}$, $SP_{16}$, $SP_{18}$, $SP_{12}$, $SP_{13}$, $SP_8$, $SP_9$.

On the other hand, when the reproduction of the recorded video signal is performed in slow reproduction mode by operating one of the switches 12e and 12f, braking timing for the capstan motor 4 is cyclically retarded or delayed by maintaining depression of the up-switch. In this case, CPU 10 performs operations at the steps $SP_1$, $SP_2$, $SP_3$, $SP_4$, $SP_6$, $SP_7$, $SP_{19}$, $SP_{23}$, $SP_{24}$, $SP_{21}$, $SP_{22}$, $SP_8$, $SP_9$. Retarding of the application timing of the brake for the capstan motor 4 is cyclically performed until the up switch 12a is released from manual operation or depression.

While the down switch 12b is held depressed, the braking timing for the capstan motor 4 is advanced to apply the brake at an earlier timing. CPU 10 performs operations in the steps $SP_1$, $SP_2$, $SP_4$, $SP_5$, $SP_6$, $SP_7$, $SP_{19}$, $SP_{23}$, $SP_{25}$, $SP_{26}$, $SP_{21}$, $SP_{22}$, $SP_8$, $SP_9$.

Similarly to that in the normal or fast reproduction mode, when both of the up and down switches 12a and 12b are operated simultaneously, CPU 10 performs operations in the steps $SP_1$, $SP_2$, $SP_3$, $SP_4$, $SP_5$, $SP_6$, $SP_{19}$, $SP_{20}$, $SP_{21}$, $SP_{22}$, $SP_8$, $SP_9$. Through the sequence of operation, the application timing of brake for the capstan motor 4 is set at the predetermined standard phase corresponding to the slow standard tracking position. On the other hand, while non of the up and down switches 12a and 12b are depressed, the tracking position corresponding to the value stored in the slow tracking memory area is cyclically read out through the operations in the steps $SP_1$, $SP_2$, $SP_4$, $SP_6$, $SP_{10}$, $SP_{14}$, $SP_{16}$, $SP_{18}$, $SP_{12}$, $SP_{13}$, $SP_8$, $SP_9$.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications of the shown embodiments which can be embodied without departing from the principle of the invention set out in the appended claims.

For instance, though the preferred embodiment of the tracking control system, according to the invention is discussed hereabove in terms of tracking for VTR, it should be possible to apply the same or similar technology for pulse-code-modulated (PCM) audio tape reproduction appratus or other appratus which require tracking. Furthermore, though the preferred embodiment of the tracking control system is applied for the VTR facilitated with variable speed reproduction mode operations, it should be appreciated that the invention should be applicable for single (normal speed) reproduction mode VTR or other appratus.

What is claimed is:

1. A tracking control system comprising:
   a head assembly for reproducing data recorded on a recording track of a recording medium;
   drive means for driving said recording medium with said recording track across said head assembly;
   adjust means for adjusting relative position of said head assembly and said recording track on said recording medium at the position where said recorded data is reproduced through said head assembly, said relative position including a preset standard position;

switch means, cooperative with said adjust means, for controlling said adjust means, said switch means including a manually operable first switch and a second switch ; and control means, responsive to manual operation of said first switch, for operating said adjust means to cause shifting said relative position between said head assembly and said recording track in a first direction, and responsive to a manual operation of said second switch for operating said adjust means to cause shifting said relative position in a second direction opposite to said first direction, said control means being further responsive to simultaneous manual operation of said first and second switches, for operating said adjust means to set said relative position at said standard position.

2. A tracking control system as set forth in claim 1, wherein said drive means is operable for driving said recording medium at mutually different first and second speeds for reproducing said recorded data in different reproduction speed modes, and said adjust means comprises a first adjusting means being active while said drive means is in operation at said first speed, for adjusting said relative position, and a second adjusting means being active while said first means is in operation at said second speed, for adjusting said relative position.

3. A tracking control system as set forth in claim 2, which further comprises memory means for storing a first data indicative of a first standard position for a first speed reproduction mode for driving said recording medium at said first speed, a second data indicative of a second standard position for a second speed reproduction mode to drive said recording medium at said second speed, a third data indicative of current relative position between said head assembly and said recording track in said first speed reproduction mode, and fourth data indicative of current relative position in said second speed reproduction mode.

4. A tracking control system as set forth in claim 3, wherein said switch means derives a fifth data indicative of a relative position toward which said adjust means is operated based on said third data and predetermined first shifting magnitude in said first and second directions during said first speed reproduction mode operation, and derives a sixth data indicative of relative position toward which said adjust means is operated based on said fourth data and second predetermined shifting magnitude in said first and second directions during said second speed reproduction mode operation.

5. A tracking control system as set forth in claim 4, wherein said switch means increases said fifth data by a first value corresponding to said first shifting magnitude when manual operation of said first switch is detected, to cause shifting of said relative position in said first direction, decreases said fifth data by said first value when manual operation of said second switch is detected, to cause shifting of said relative position in said second direction, increases said sixth data by a second value corresponding to said second shifting magnitude when manual operation of said first switch is detected, to cause shifting of said relative position in said first direction, and decreases said sixth data by said second value when manual operation of said second switch is detected, to cause shifting of said relative position in said second direction.

6. A tracking control system as set forth in claim 5, wherein said switch means cyclically checks manual operation of said first and second switches for cyclically adjusting said relative position by operating said switch means.

7. A tracking control system as set forth in claim 1, which further comprises memory means for storing a first data indicative of said standard position and second data indicative of a current relative position.

8. A tracking control system as set forth in claim 3, wherein said switch means derives a third data indicative of relative position toward which said adjust means is operated based on said second data and predetermined shifting magnitude in said first and second directions.

9. A tracking control system as set forth in claim 8, wherein said switch means increases said third data by a value corresponding to said predetermined shifting magnitude when manual operation of said first switch is detected, to cause shifting of said relative position in said first direction and decreases said third data by said value when manual operation of said second switch is detected, to cause shifting of said relative position in said second direction.

10. A tracking control system as set forth in claim 9, wherein said switch means cyclically checks manual operation of said first and second switches for cyclically adjusting said relative position by operating said adjust means.

* * * * *

UNITED STATES PATENT AND TRADEMARK OFFICE
CERTIFICATE OF CORRECTION

PATENT NO. : 4,782,405

DATED : November 1, 1988

INVENTOR(S) : Toshiaki IMAI

It is certified that error appears in the above-identified patent and that said Letters Patent is hereby corrected as shown below:

Column 1, line 17, before "VTR" insert --a--;
    line 21, before "VTR" insert --the--;
    line 22, before "fast" and before "normal" insert --a--;
    line 25, before "slow" insert --the--;
    line 30, before "tape" insert --the--;
    line 32, before "capstan" and before "magnitude" insert --the--;
    line 38, before "different" insert --a--;
    line 40, after "volumes" insert --,--;
    line 44, change "mode," to -- mode --;
    line 45, before "VTR" INSERT --the--, and before "differ" insert --a--;
    line 57, before "tracking" insert --the--;
    line 60, change "made" to --effective--;
    line 64, change "simplifys" to --simplifies the--;

Column 2, line 14, before "relative" insert --a--;
    line 22, before "the" insert --of-- and change "poisition" to --position--;
    line 25, after "shifting" insert --of--;
    line 35, before "relative" insert --a--;
    line 47, before "the relative" insert -- of--;
    line 52, after "in" insert --a--, and change "manually operated" to --manually-operated--;
    line 54, change "the further" to --another--;

Column 3, line 1, before "current" insert --the--;
    line 4, before "relative" insert --the--;
    line 8, before "predetermined" insert --a--;
    line 11, before "relative" insert --the--;
    line 12, before "second" insert --a--;
    line 49, before "particularly" insert --and--;
    line 57, change "cirucit" to --circuit--, and change "reff-" to --ref- --;

UNITED STATES PATENT AND TRADEMARK OFFICE
CERTIFICATE OF CORRECTION

PATENT NO. : 4,782,405
DATED : November 1, 1988
INVENTOR(S) : Toshiaki IMAI

It is certified that error appears in the above-identified patent and that said Letters Patent is hereby corrected as shown below:

Column 3, line 58, before "CTL" insert --as a--;

Column 4, line 1, before "phase" insert --the--;
    line 12, change "brake" to --braking--, first occurrance;
    line 17, before "is" insert --10--;
    line 19, after "includes" insert --an--;
    line 20, change "up-switch" to -- up switch--, and before "down" insert --a--;
    line 21, before "fast" insert --a--;
    line 22, before "slow" insert --and--;
    line 29, before "slow" insert --the--;
    line 31, change "tacking" to --tracking--;
    line 33, before "whether" insert --to determine--;
    line 34, before "at" insert --or not--, and after "operated" delete "or not";
    line 35, change "Namely, while" to -- While --;
    line 36, before "stand-by" insert --a--;
    line 37, before "tracking" and before "manual" insert --the--;
    line 43, before "check" insert --a--, and before "whether" insert --to determine--;
    line 44, change "a step" to -- the step --;
    line 45, change "a step" to -- the step --;
    line 46, change "a step" to -- the step --;
    line 47, change "a step" to -- the step --, and change "or" to --or,--;
    line 48, before "process" insert -- the --, and change "goes" to --continues--;
    line 49, before "whether" insert --to determine--, and before "the" insert --or not--;
    line 50, delete "or not";

UNITED STATES PATENT AND TRADEMARK OFFICE
CERTIFICATE OF CORRECTION

PATENT NO. : 4,782,405

DATED : November 1, 1988

INVENTOR(S) : Toshiaki IMAI

It is certified that error appears in the above-identified patent and that said Letters Patent is hereby corrected as shown below:

Column 4, line 53, change "$SP_5$" to --$SP_5$,--;
           line 54, before "process" insert --the--;
           line 55, before "reproduction" isert --the--;
           line 56, before "whether" insert --to determine--, and before "normal" insert --the--;
           line 58, before "normal" insert --in the--;
           line 60, before "process", insert --the--, and change "check" to --determine--;
           line 61, before "slow" insert --in the--;
           line 64, before "slow" insert --the--, and delete "the";
           line 65, change "non" to --none-- and change "mode" to --modes--;
           line 66, before "process" insert --the--;

Column 5, line 2, before "normal" insert --in the--;
           line 3, before "process" insert --the--;
           line 4, before "whether" insert --to determine--;
           line 5, before "flags insert --the-- both occurrances;
           line 6, before "standard" insert --the--;
           line 7, change "13," to --13--;
           line 8, change "data," to --data--;
           line 10, change "output" to --outputted--;
           line 11, change "$DC_1$" to --$DC_1$,--;
           line 19, change "Thereafterm" to --Thereafter, the--;
           line 22, delete "of" and after "and" insert --the--;
           line 23, change "are both" to --are--;
           line 24, change "of" to --the--, and change "VTR" to --respectively, the VTR--;
           line 25, before "selected" insert --a--;
           line 26, before "standard" insert --a--;
           line 27, after "or" insert --the--;
           line 28, before "check" insert --a--;
           line 29, before "whether" insert --to determine--;
           line 34, before "CPU" insert --The--;

UNITED STATES PATENT AND TRADEMARK OFFICE
CERTIFICATE OF CORRECTION

PATENT NO. : 4,782,405

DATED : November 1, 1988

INVENTOR(S) : Toshiaki IMAI

It is certified that error appears in the above-identified patent and that said Letters Patent is hereby corrected as shown below:

Column 5, line 36, change "output" to --outputs--;
        line 41, before "normal" and before "fast" insert --a--;
        line 42, change "magnitude" (first occurrence) to --magnitude,--, and after "advancing" insert --the--;
        line 43, after "the" insert --phase on the--, and change "motor's phase" to --motor--;
        line 46, delete "herefrom";
        line 51, change "whether it is set or not," to --to determine whether or not it is set,--;
        line 56, before "during", insert --12b--;
        line 60, change "output" to --outputted--, and change "Then the" to --The--;
        line 61, before "stored" insert --then--;
        line 63, change "Therefore" to -- Thus --;
        line 64, before "normal" insert --the--;
        line 65, change "tude" to --tude,--, and after "retarding" insert --the--;
        line 66, change "motor a" to --motor 4 at a--;
        line 67, change "strandard" to --standard--;
        line 68, change "decleased" to --decreased--;

Column 6, line 2, change "motor" to --motor 4--;
        line 3, change "herefrom" to --therefrom--;
        line 4, change "screased" to --creased--;
        line 7, change "and" to --or--;
        line 11, change "read out value is output" to --the read out value, is outputted--;
        line 15, after "when" insert --the--;
        line 16, before "pro-" insert --the--;
        line 18, change "whether both of flags" to --to determine whether both of the flags--;
        line 20, before "standard" insert --the--;
        line 24, change "output" to --outputted--;

UNITED STATES PATENT AND TRADEMARK OFFICE
CERTIFICATE OF CORRECTION

PATENT NO. : 4,782,405

DATED : November 1, 1988

INVENTOR(S) : Toshiaki IMAI

It is certified that error appears in the above-identified patent and that said Letters Patent is hereby corrected as shown below:

Column 6, line 25, change "$DC_2$" to --$DC_2$,--;
        line 33, change "Thereafter" to --Thereafter, the--;
        line 37, after "are" delete "both";
        line 38, after "$SP_5$," insert --respectively, the--;
        line 39, after "in" insert --the-- (both occurrences);
        line 42, before "check" insert --a--;
        line 43, before "whether" insert -- to determine --;
        line 50, change "output" to --outputs--;
        line 55, before "slow" insert --the--, and after "magnitude" insert --,--;
        line 56, before "magnitude" insert --the--;
        line 57, after "motor" insert --at--;
        line 60, delete "herefrom";
        line 66, before "whether" insert -- to determine--, and change "it is set or not" to --or not it is set--;

Column 7, line 2, after "13" delete "and";
        line 7, change "output" to --outputted--;
        line 8, change "stroed" to -- stored --;
        line 11, before "slow" insert --the--, and after "magnitude" insert --,--;
        line 12, before "magnitude" insert --the--;
        line 13, after "motor" insert --,--;
        line 15, change "cleased" to --creased--;
        line 18, change "herefrom," to --therefrom,--;
        line 22, change "non" to --none--;
        line 23, change "are" to --is--;
        line 26, change "output" to --outputted--;
        line 28, after "zero," insert --and--;
        line 31, before "up" insert --the--;
        line 35, before "normal" and before "fast" insert --a--;
        line 38, change "contine-" to --continu- --;
        line 39, change "Namely, while" to --Thus, when--;

UNITED STATES PATENT AND TRADEMARK OFFICE
CERTIFICATE OF CORRECTION

PATENT NO. : 4,782,405

DATED : November 1, 1988

INVENTOR(S) : Toshiaki IMAI

It is certified that error appears in the above-identified patent and that said Letters Patent is hereby corrected as shown below:

Column 7, line 40, before "CPU" insert --the--;
        line 53, change "Namely" to --Thus--, and before "CPU" insert --the--;
        line 61, before "CPU" insert --the--;
        line 66, change "while" to --when--;
        line 67, change "non" to --none--, and change "are" to --is--;

Column 8, line 5, change "On the other hand" to --Moreover--;
        line 6, before "slow" insert --the--;
        line 10, change "up-switch" to --up switch--, and before "CPU" insert --the--;
        line 26, change "brake" to --braking--;
        line 29, change "while non" to --when none--;
        line 45, change "though" to --although--;
        line 47, change "hereabove" to --above--, and before "VTR," insert --a--;
        line 50, change "appratus" to --apparatus-- (both occurrences);
        line 56, change "appratus" to --apparatus--;
Column 1, line 63, change "relative" to --a relative--;
        line 65, change "the" to --a--;

Column 9, in claim 1, line 7, after "cause" insert --a--, and before "said" insert --of--;
        line 11, after "cause" insert --a--, and before "said" insert --of--;

in claim 4, line 41, delete "a";
        line 43, after "and" insert --a--;

UNITED STATES PATENT AND TRADEMARK OFFICE
CERTIFICATE OF CORRECTION

PATENT NO. : 4,782,405

DATED : November 1, 1988

INVENTOR(S) : Toshiaki IMAI

It is certified that error appears in the above-identified patent and that said Letters Patent is hereby corrected as shown below:

Column 10, in claim 7, line 25, delete "a";
         in claim 7, line 27, before "current" insert --the--;
         in claim 8, line 29, delete "a";
         in claim 8, line 30, before "relative" insert --the--.

Signed and Sealed this

Fourteenth Day of January, 1992

Attest:

HARRY F. MANBECK, JR.

*Attesting Officer*      *Commissioner of Patents and Trademarks*